Aug. 11, 1942.　　　A. DE L. SINDEN　　　2,292,793
CONVEYER
Filed April 3, 1940

INVENTOR
Alfred DeLos Sinden
BY J. Stanley Churchill
ATTORNEY

Patented Aug. 11, 1942

2,292,793

UNITED STATES PATENT OFFICE 2,292,793

CONVEYER

Alfred De Los Sinden, Aurora, Ill., assignor to Redler Conveyor Company, Quincy, Mass., a corporation of Massachusetts Application April 3, 1940, Serial No. 327,666

15 Claims. (Cl. 198—172)

This invention relates to a conveyer and to a conveying element therefor.

The invention has for one of its objects to provide a novel and improved conveyer in which provision is made for supporting the conveying element in the casing through which it is drawn in a novel manner such as to enable the conveyer to perform the conveying operation with maximum efficiency.

A further object of the invention is to provide a novel and improved conveyer of the character specified having a novel conveying element comprising a tension element having a plurality of conveying flights connected thereto in which provision is made for operatively supporting the tension element in a casing or trough separate from the main conveying trough or casing whereby to keep the material being conveyed free from foreign matter which might become detached from the tension element.

A still further and more specific object of the invention is to provide a novel and improved conveying element made up of a plurality of detachably connected links having provision for interchangeably attaching different flight members thereto whereby the flights may be readily removed and replaced with flights of a different size or style resulting in economy of production, convenience in installation, and adaptability to various operating conditions.

With these general objects in view and such others as may hereinafter appear, the invention consists in the conveyer and in the conveying element hereinafter described and particularly defined in the claims at the end of this specification.

Figure 1:
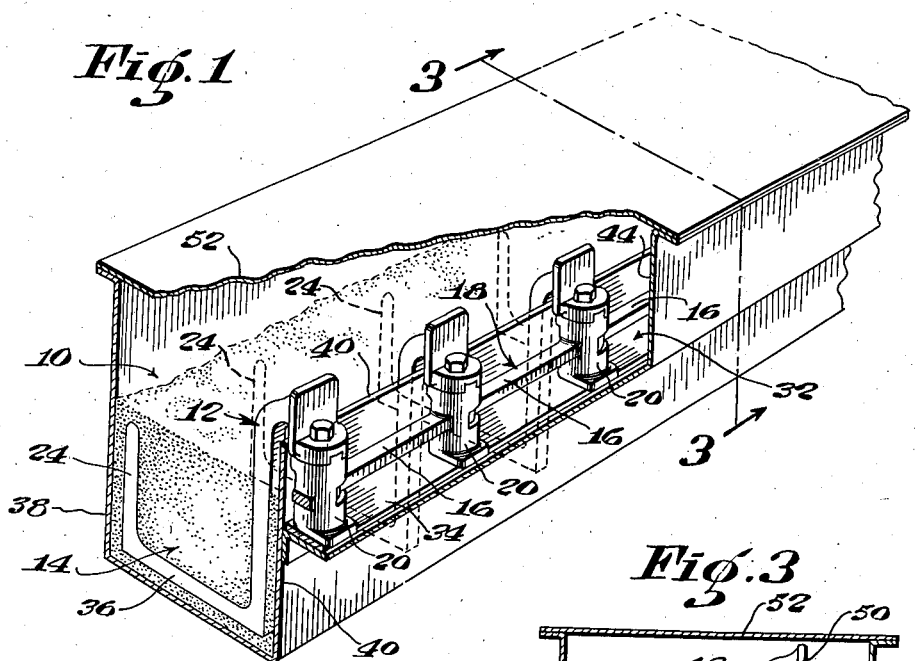
Figure 2:
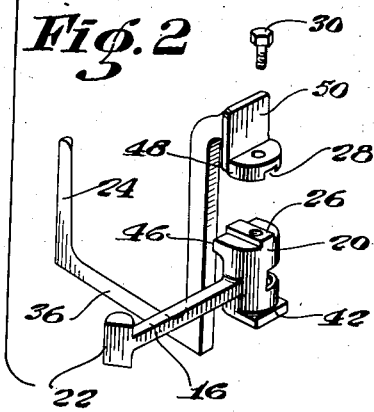
Figure 3:
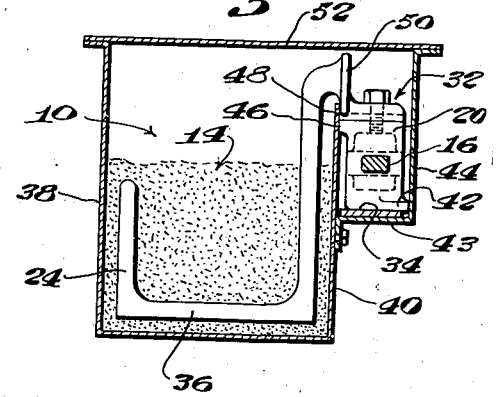
Figure 4:
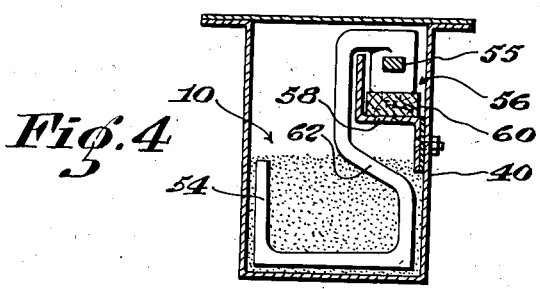

In the drawing illustrating the preferred embodiment of the invention, Fig. 1 is a perspective view with portions broken away illustrating the present conveyer; Fig. 2 is a perspective detail view of one unit of the conveying element showing the parts detached; Fig. 3 is a cross-sectional view on the line 3—3 of Fig. 1; and Fig. 4 is a similar view of a modified form of the present invention.

In general, the present invention contemplates an improvement in the conveyer illustrated and described in the United States Patent to Sinden, No. 2,155,874, April 25, 1939. The present invention contemplates a conveyer of the type in which flowable solid material is drawn through a casing by a conveying element having a plurality of spaced flights, preferably of open structure, which are flexibly connected together above the main bodies of the flights and above the normal level of the material being conveyed. Provision is made for operatively supporting the flights upon the casing, preferably by a separate trough mounted upon the upper portion thereof within which the tension element or connection between flights is arranged to run. Each flight may and preferably will be detachably connected to the tension element whereby flights of different style and design may be interchangeably attached to the tension element and enabling broken or worn flights to be easily and economically replaced. This construction also lends itself to standardization and uniformity in the production of the various parts of the conveyer with the resultant advantages flowing therefrom.

Referring now to the drawing which illustrates the preferred embodiment of the invention, the conveyer includes a casing or trough 10 which may extend in a curved path and which is provided with a conveying element 12 of open structures disposed therein and capable of being moved therethrough to effect the conveyance of flowable solid material 14 through the trough in a continuous stream. The conveying element 12, as herein illustrated, is made up of a plurality of connected links 16, comprising the tension element 18, each link being of the construction illustrated in detail in Fig. 2. Each tension link 16 is provided at one end with a slotted hub 20 of general cylindrical shape and at the other end with a lug or boss 22 which is adapted to be received within the hollow hub 20 of the next succeeding link of the tension element.

As illustrated in Figs. 1, 2 and 3, in one embodiment of the invention, the tensioning element is provided with a plurality of individual U-shaped flight members 24 detachably secured thereto. One arm of each U-shaped flight is longer than the other, extending above the level of the material in the trough 10 and a flight member is connected to the top of each hub portion 20 of the tension links by a horizontally extended tongue and groove connection 26, 28, and by a bolt 30. As herein shown, the tensioning element 18 is supported in a separate trough 32 mounted on the trough 10 above the level of the material being conveyed, and is arranged to travel therethrough with the cylindrical hub portions 20 disposed vertically. In operation, the bottom end of the cylindrical portion of each link slides along an elongated rail 34 provided in the bottom of the trough 32 and disposed at a level such as to suspend the bottom arm 36 of the U-shaped flight above the bottom of the trough 10.

Provision is made for guiding the flight members laterally with relation to the side walls 38, 40 of the trough 10, and as shown in Fig. 3, the lower end of each hub 20 is provided with a flanged portion 42 which is arranged to engage the inner surface of the wall 44 of the trough 32 and the upper end of each hub 20 is provided with a flanged portion 46 on the opposite side of the hub which is contiguous with a similar portion 48 provided on each adjacent flight and which is arranged to bear against the opposing wall of the trough 32 which in the embodiment shown in Fig. 3, comprises the wall 40 of the trough 10. A vertically extended portion 50 also provided on each flight is arranged to overhang the top edge of the wall 40. Thus, the tensioning element is supported vertically in the trough 32 in sliding engagement with the bottom and side walls thereof which operates to maintain the attached flights in spaced relation to the walls and bottom of the trough 10.

In the embodiment of the invention thus far described, it will be observed that the trough 32 formed by the shortened side wall 40 and an angle member having a bottom wall 43 and side wall 44 attached to the side wall 40 provides a shield between the tension element and the material being conveyed in the trough 10 so as to prevent any foreign matter upon the tension element from falling into the material. As herein shown, a cover 52 extends across the top of both conduits 10 and 32. It will be observed that the top of the extended portion 50 is disposed adjacent the under surface of the cover 52 in order to prevent vertical displacement of the conveying element.

As illustrated in Fig. 4, a modified form of the present invention may comprise the casing or trough 10 having a conveying element in which the flights 54 are formed integrally with the tension links 55 and in which a second trough 56 is provided within the casing. The trough 56 formed by an angle member 58 attached to the inner surface of the side wall 40 is disposed above the level of the material in the trough 10 and is provided with an elongated rail 60 along which the tension element is arranged to slide. As herein shown, each integral U-shaped flight member 54 is formed with an offset portion 62 to accommodate the position of the trough 56 directly above. The embodiment illustrated in Fig. 4 is of particular advantage for installations where space is limited.

Prior to the present invention it has been the usual practice to run the tension element dry, that is, without lubrication, so that particles of the metal were liable to wear off and fall into the material. The provision of a separate trough for the tension element permits the latter to be provided with lubrication thus eliminating excessive wear and providing a shield between the tension element and the material being conveyed. In addition, the novel construction of the conveying element having detachably connected flights permits the conveying element to be adapted to various sizes and shapes of conveyers.

While the preferred embodiment of the present invention has been herein illustrated and described, it will be understood that the invention may be embodied in other forms within the scope of the following claims.

Having thus described the invention, what is claimed is:

1. In a conveyer for conveying flowable solid material, in combination, a casing providing a trough for said material, a conveyer element traversable therethrough comprising a plurality of spaced flight members of smaller sectional dimensions than said casing and means connecting said spaced flights, said casing containing means at one side secured to a side wall thereof and cooperating with the upper portion of the flight for supporting substantially the entire weight of said conveying element and maintaining the flight members spaced from the side and bottom walls of the casing as the conveying element is drawn through the casing.

2. A conveyer for conveying flowable solid material, comprising an elongated casing providing a trough for said material and a conveying element traversable therethrough, said conveying element comprising a plurality of spaced flight members of smaller sectional dimensions than said casing and connecting means for flexibly connecting the flight members, said casing having means therein connected to a wall thereof and forming an open top trough for supporting said flight connecting means to suspend the flights within the casing and to maintain said flight members spaced from the side walls of said casing.

3. In a conveyer for conveying flowable solid material, in combination, a casing providing a trough for said material, a conveying element traversable therethrough comprising a plurality of spaced generally U-shaped flight members of open structure and of slightly smaller size than the inner dimensions of said casing, and a tension element connecting the upper portions of the corresponding legs of said generally U-shaped flight members, said casing carrying means arranged below said tension element and extending for at least the full width of said tension element for supporting said conveying element, said means being further arranged to limit transverse movement of said conveying element, whereby to maintain said generally U-shaped flight members spaced from the walls of said casing.

4. In a conveyer for conveying flowable solid material, in combination, a casing providing a trough for said material, a conveying element traversable therethrough comprising a plurality of flights and a tension element connecting the upper portions of the corresponding portions of said flights, said casing having means carried by a side wall thereof for supporting said conveying element independently of engagement of the body of said flights with the walls of the casing.

5. In a conveyer for conveying flowable solid material, in combination, a casing, a conveying element traversable therethrough, comprising a plurality of spaced U-shaped flight members of open structure and a tension element comprising a plurality of pivotally and detachably connected links for connecting the upper portions of corresponding legs of said flights, said tension element being disposed to one side of the leg with which it is connected and a separate raceway adapted to receive said tension element mounted on a side wall of the casing through which said tension element is drawn to support the flight members within said casing.

6. In a conveyer for conveying flowable solid material, in combination, a casing providing a trough for said material, a conveyer element traversable therethrough comprising a plurality of spaced flight members and a tension element connecting said spaced flights, and means for supporting said conveying element comprising an elongated trough mounted on a side wall of the casing and arranged to receive said tension element and to support and maintain said flight members in predetermined relation to the side and bottom walls of said casing.

7. In a conveyer for conveying flowable solid material, in combination, a casing, a conveyer element traversable therethrough comprising a plurality of spaced U-shaped flights of open structure and a tension element comprising a plurality of pivotally and detachably connected links for connecting the upper portions of corresponding legs of the flights, and means for supporting said conveying element providing an elongated and relatively small trough mounted on a side wall of the casing and in open communication with the interior of the casing arranged to receive said tension element, said connecting links having surfaces engageable with the walls defining said small trough whereby to support and maintain said flight members in predetermined relation to said casing.

8. In a conveyer for conveying flowable solid material, in combination, a casing adapted to receive said material, a conveyer element traversable therethrough comprising a plurality of flights and a tension element comprising a plurality of pivotally and detachably connected links for connecting the upper portions of corresponding portions of the flights, and means for supporting said conveying element providing an elongated and relatively small trough mounted on a side wall of the casing and in open communication with the interior of the casing arranged to receive said tension element, said connecting links having surfaces engageable with the walls defining said small trough whereby to support and maintain said flight members in predetermined relation to said casing.

9. In a conveyer for conveying flowable solid material, in combination, a casing, a conveying element traversable therethrough comprising a plurality of spaced U-shaped flight members of open structure and a plurality of pivotally and detachably connected links for detachably connecting the upper portions of the corresponding legs of said flight, said links being disposed to one side of said corresponding legs and means within said casing for supporting said conveying element adapted to maintain said flight members in spaced relation to the side and bottom walls of said casing.

10. In a conveyer for conveying flowable solid material, in combination, an upwardly opening casing comprising a trough through which the material is conveyed, a second upwardly opening trough carried by a side wall of said material trough, a conveying element comprising a plurality of spaced conveying flights traversable through said material trough, and means for connecting said spaced flights, said means being adapted to run in said second trough.

11. In a conveyer for conveying solid flowable material, in combination, a casing comprising a trough through which the material is conveyed, a second trough formed exteriorly of said material trough with one side wall of the material trough forming one wall of said second trough, a conveying element comprising a plurality of spaced conveying flights traversable through said material trough and tension means for connecting said spaced flights, said second trough being adapted to receive said tension means thereby separating the latter from direct communication with said material trough.

12. In a conveyer for conveying material, in combination, a casing comprising a trough through which the material is conveyed, an open trough formed interiorly of said material trough with one wall of the material trough forming an upright side wall of said open trough, and a conveying element comprising a plurality of spaced conveying flights traversable through said material trough and tension means for connecting said spaced flights, said open trough being adapted to receive and support said tension means therein and to maintain said flights spaced from the walls of said casing.

13. A conveying element comprising a plurality of spaced conveying flights of open construction, a tension element comprising a plurality of pivotally and detachably connecting links, and means for attaching said flights to said links including a tongue portion formed on said links arranged to be received in a grooved portion provided in said flights and a bolt for connecting said members together in assembled substantially non-rotatable relation.

14. In a conveyer for conveying material, in combination, a casing providing a trough through which the material is conveyed, an angular member secured to an upright wall of said casing and including portions extending substantially at right angles and parallel, respectively, to said upright wall to provide an open trough in said casing, and a conveying element comprising a plurality of spaced conveying flights traversable through said material trough and means connecting said spaced flights together, said open trough being adapted to receive said connecting means and to serve as a support therefor and to maintain said flights spaced from the walls of said casing.

15. In a conveyer for conveying material, in combination, a casing through which the material is conveyed, said casing including a bottom wall and opposed side walls, a member mounted upon one of said side walls including portions extending at right angles and parallel, respectivley, to said side wall, whereby to provide an open trough, a plurality of flights traversable through said casing, each of said flights including a portion overhanging an edge of said open trough, and means connecting said flights together, said means being received in said open trough.

ALFRED DE LOS SINDEN.